(12) United States Patent
Gholap et al.

(10) Patent No.: US 11,315,251 B2
(45) Date of Patent: Apr. 26, 2022

(54) METHOD OF OPERATION OF AN ARTIFICIAL INTELLIGENCE-EQUIPPED SPECIMEN SCANNING AND ANALYSIS UNIT TO DIGITALLY SCAN AND ANALYZE PATHOLOGICAL SPECIMEN SLIDES

(71) Applicant: OptraSCAN, Inc, Cupertino, CA (US)

(72) Inventors: Abhijeet Sharadchandra Gholap, Cupertino, CA (US); Isha Doshi, Cupertino, CA (US); Gurunath Kamble, Cupertino, CA (US)

(73) Assignee: OPTRASCAN, INC, Cupertino, CA (US)

( * ) Notice: Subject to any disclaimer, the term of this patent is extended or adjusted under 35 U.S.C. 154(b) by 256 days.

(21) Appl. No.: 16/853,481

(22) Filed: Apr. 20, 2020

(65) Prior Publication Data
US 2020/0334814 A1    Oct. 22, 2020

Related U.S. Application Data

(60) Provisional application No. 62/836,271, filed on Apr. 19, 2019.

(51) Int. Cl.
*G06K 9/00* (2022.01)
*G06T 7/00* (2017.01)
*G06K 9/62* (2022.01)
*G06N 20/00* (2019.01)

(52) U.S. Cl.
CPC .......... *G06T 7/0014* (2013.01); *G06K 9/6228* (2013.01); *G06K 9/6268* (2013.01); *G06N 20/00* (2019.01); *G06T 2207/20081* (2013.01); *G06T 2207/20212* (2013.01); *G06T 2207/30024* (2013.01); *G06T 2207/30096* (2013.01)

(58) Field of Classification Search
CPC ......... G06T 7/0014; G06T 2207/20081; G06T 2207/20212; G06T 2207/30024; G06T 2207/30096; G06N 20/00; G06K 9/6228; G06K 9/6268
See application file for complete search history.

(56) References Cited

U.S. PATENT DOCUMENTS

| 2013/0290225 | A1* | 10/2013 | Kamath | G06V 20/69 706/12 |
| 2017/0103521 | A1* | 4/2017 | Chukka | G06T 7/0012 |
| 2021/0216746 | A1* | 7/2021 | Nie | G06V 20/698 |

* cited by examiner

*Primary Examiner* — Atiba O Fitzpatrick (57) ABSTRACT

In a method of operation of an artificial intelligence-equipped specimen scanning and analysis unit to digitally scan and analyze pathological specimen slides, a sample slide with a mounted tissue sample is scanned and analyzed according to one or more user-selected algorithms in order to generate a heatmap visually depicting the presence of one or more user-selected sample attributes of the tissue sample. One or more artificial intelligence modules, including a deep learning computation module, is provided and can be trained by the user for future analysis of new samples. One or more regions of interest may be selected from the heatmap to include in the results of the analysis. A focus window may be used to closely inspect any given region of the whole slide image, and a trail map is generated from the movement of the focus window.

16 Claims, 10 Drawing Sheets

METHOD OF OPERATION OF AN ARTIFICIAL INTELLIGENCE-EQUIPPED SPECIMEN SCANNING AND ANALYSIS UNIT TO DIGITALLY SCAN AND ANALYZE PATHOLOGICAL SPECIMEN SLIDES

The current application claims a priority to the U.S. Provisional Patent application Ser. No. 62/836,271 filed on Apr. 19, 2019. The current application is filed on Apr. 20, 2019, whereas Apr. 19, 2019 was on a weekend.

FIELD OF THE INVENTION

The present invention relates generally to digital pathology. More particularly, the present invention relates to image acquisition and analysis of biological specimens in a singular, self-contained unit.

BACKGROUND OF THE INVENTION

Digital Pathology slide scanners today in the market are restricted to partial or whole slide image acquisition and digitization of slide into an image. There exists a demand for a singular unit capable of scanning and analyzing a tissue sample on a sample slide.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

Figure 1:
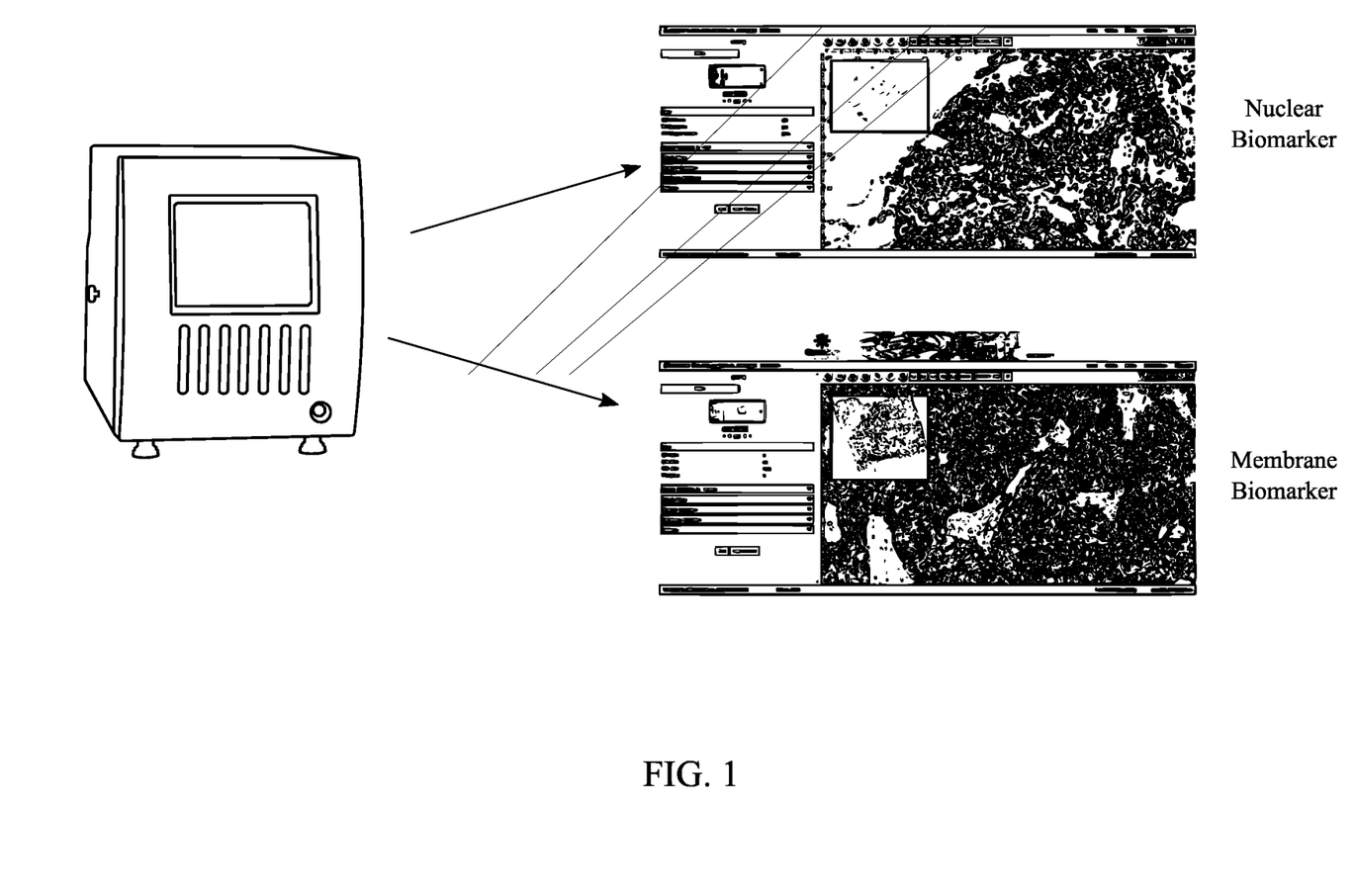
FIG. 1 is an illustration of the AI scanner and examples of the results of a pathological analysis in accordance with the present invention.

The present invention relates to a new generation artificial intelligence (AI)-enabled pathological slide scanning unit that identifies regions to scan and digitize and additionally performs digital pathological analysis on the scanned images for the purposes of immunopathology. The slide scanning unit may be referred to in some instances as a "Pathology AI Scanner" or "AI scanner." The slide scanning unit provides benefit to a histopathologist, cytopathologist, or other user in that the user is able to utilize a single unit to not only scan a slide, but also view results of a pathological analysis of the tissue sample mounted to the slide. The analysis results include a heatmap generated by the present invention that enables a user to quickly identify regions of interest of the tissue sample and view results specific to said regions in order to efficiently evaluate the tissue sample in order to make a diagnosis or other diagnostic conclusion. FIG. 1 shows an illustration of the AI Scanner and exemplary pathological analysis results.

Figure 2:
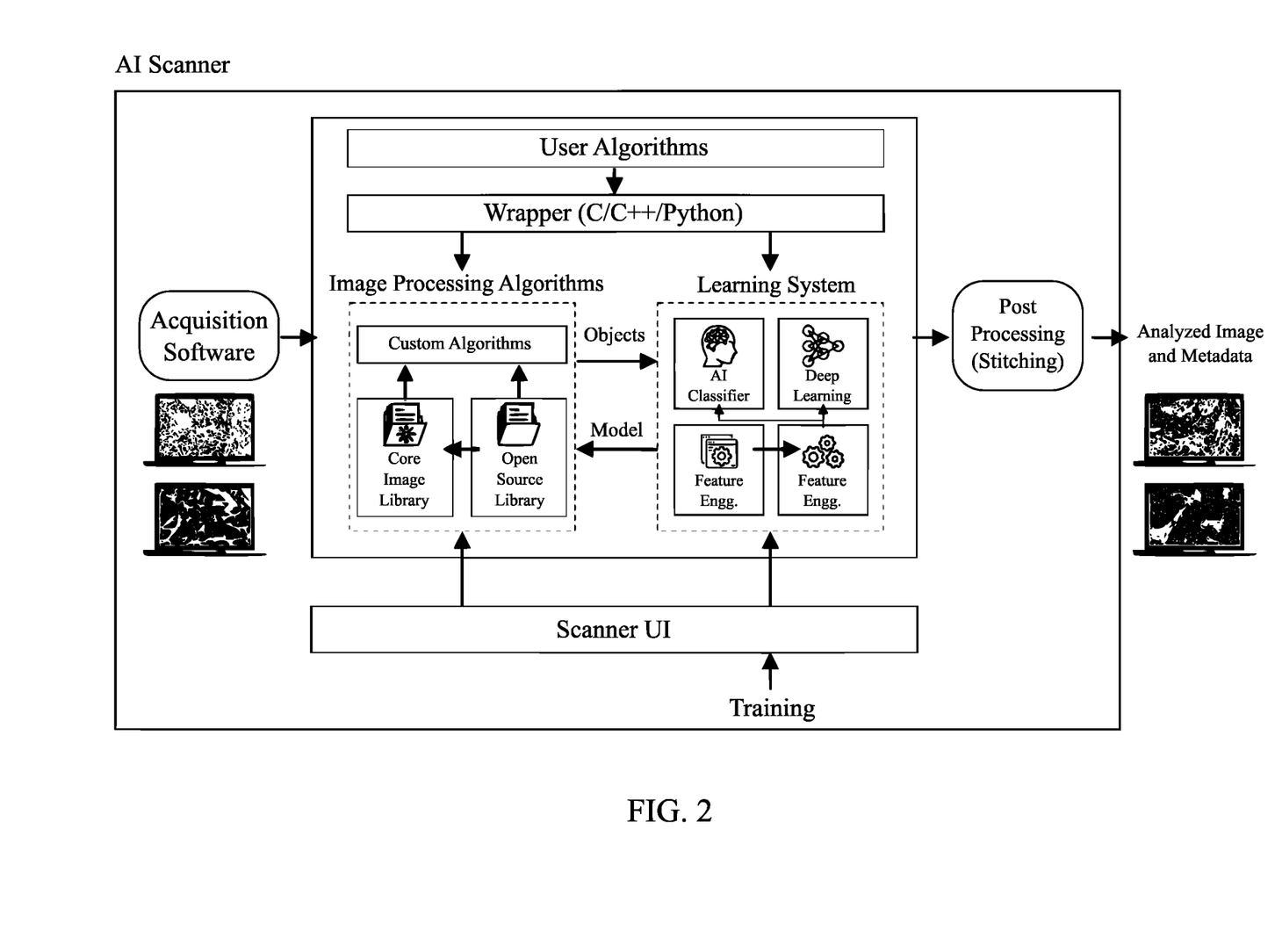
FIG. 2 is a general functional diagram of the present invention.

As illustrated in FIG. 2, in the preferred embodiment of the present invention, the AI scanner has one or more custom algorithms provided with an embedded AI framework and plugin architecture. The framework consists of a core imaging library, open source libraries such as, but not limited to, OpenCV, and AI modules for training cellular object classifiers. Further, the framework defines interfaces and provides one or more application programming interfaces to process captured images, which enables a user to write an algorithm plugin for image analysis and classification of recognized cellular objects. The core imaging library has modules for purposes such as, but not limited to, preprocessing, segmentation, morphological and image data structure manipulation algorithms. The custom algorithms provide features such as, but not limited to, real time region of interest (ROI) detection while scanning, cell quantification for IHC/HNE markers, rare event detection, and morphological measurements, built using the core library.

The AI based modules in the framework can be trained for classification problems; for example, but not limited to, tumor vs benign. A user can train the AI module by labeling segmented cellular objects for classification and selecting features generated by feature engineering algorithms included in the preferred embodiment of the present invention. This trained model can be saved for analyzing new images to be scanned.

In the general workflow of the present invention, AI based classification modules and complex image processing algorithms are embedded in the AI scanner itself without the need for additional or external processing applications. Once a sample slide is loaded, the user can select a custom algorithm per tissue type or marker type. As the slide is being scanned, each region is parallelly processed and analyzed in different threads.

Overlay details and quantified scores are generated and stored as indexed metadata associated with the whole scan digital image of the sample slide. After the scan is complete, the user is presented with analyzed data for the digitized whole slide image of the sample slide. The user is able to pan the image in a viewer window, and a corresponding overlay is displayed in a separate thumbnail window, along with a score for the current region being viewed. As the user pans around the whole slide image, a trail map is generated to indicate regions of the whole slide image the user has already viewed.

A heat map is generated on the thumbnail window indicated hotspot areas, or regions with high quantified scores, on the whole slide image with different color codes for easy reference. The color codes can be customized per output bins; for example, different colors may be used for regions with high positivity and regions with low positivity. The trail map provides the user with a visual indication as to where on the whole slide image they have previously viewed, and the user can manually select ROIs to be added to the analysis report. The user may compare the trail map with the system generated heatmap to ensure that they have visited all necessary sections of tissue or other cell areas before arriving at the final interpretation of the case or experiment under consideration.

More specifically, the present invention is a method of operation of an artificial intelligence-equipped specimen scanning and analysis unit to digitally scan and analyze pathological specimen slides. A slide scanning system is provided, in addition to a processing unit, a digital display, and a user interface. The slide scanning system comprises an image acquisition unit, which may be any suitable type of camera or other relevant technology capable of adequately capturing images of a tissue sample mounted to a sample slide. The slide scanning system, the digital display, and the user interface are each electronically connected to the processing unit. The processing unit manages a plurality of image processing algorithms and at least one AI module, wherein the at least one AI module comprises at least one cellular classification model. Furthermore, a sample slide is provided engaged with the slide scanning system, wherein a tissue sample is mounted to the sample slide.

Figure 3:
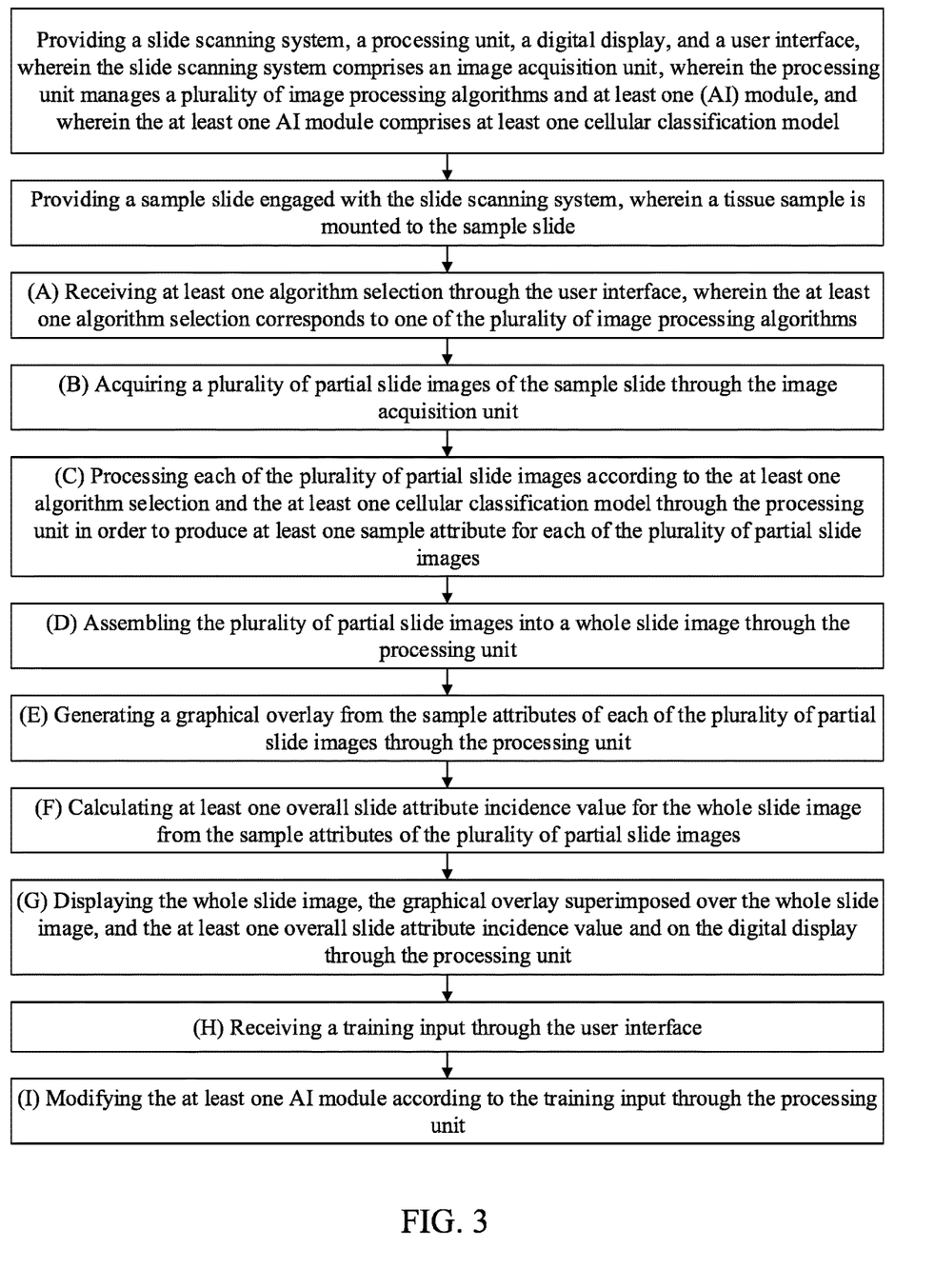
FIG. 3 is a stepwise flow diagram of the general method of the present invention.

In the general method of the present invention as shown in FIG. 3, at least one algorithm selection is received through the user interface, wherein the at least one algorithm selection corresponds to one of the plurality of image processing algorithms (Step A). A plurality of partial slide images of the sample slide is then acquired through the image acquisition unit (Step B). Each of the plurality of partial slide images is processed according to the at least one algorithm selection and the at least one cellular classification model through the processing unit in order to produce at least one sample attribute for each of the plurality of partial slide images (Step C). The plurality of partial slide images is assembled into a whole slide image through the processing unit (Step D). A graphical overlay is generated from the sample attributes of each of the plurality of partial slide images through the processing unit (Step E). At least one overall slide attribute incidence value is calculated for the whole slide image from the sample attributes of the plurality of partial slide images (Step F). The whole slide image is then displayed on the digital display, as well as the at least one overall slide attribute incidence value (Step G). The graphical overlay is also displayed on the digital display superimposed over the whole slide image. At this point, the user is able to view the general results of the analysis, and may further interact with the user interface to view subsections of the whole slide images enlarged for detail, choose regions of interest to include in the displayed analysis report, or perform other actions. In the preferred embodiment, the user may further interact with the system in order to train the at least one AI module. To this end, a training input is received through the user interface (Step H), and the at least one AI module is modified according to the training input through the processing unit (Step I). In various embodiments, the specific nature of the training input and the specific nature of its modification to the AI module may vary.

Figure 4:
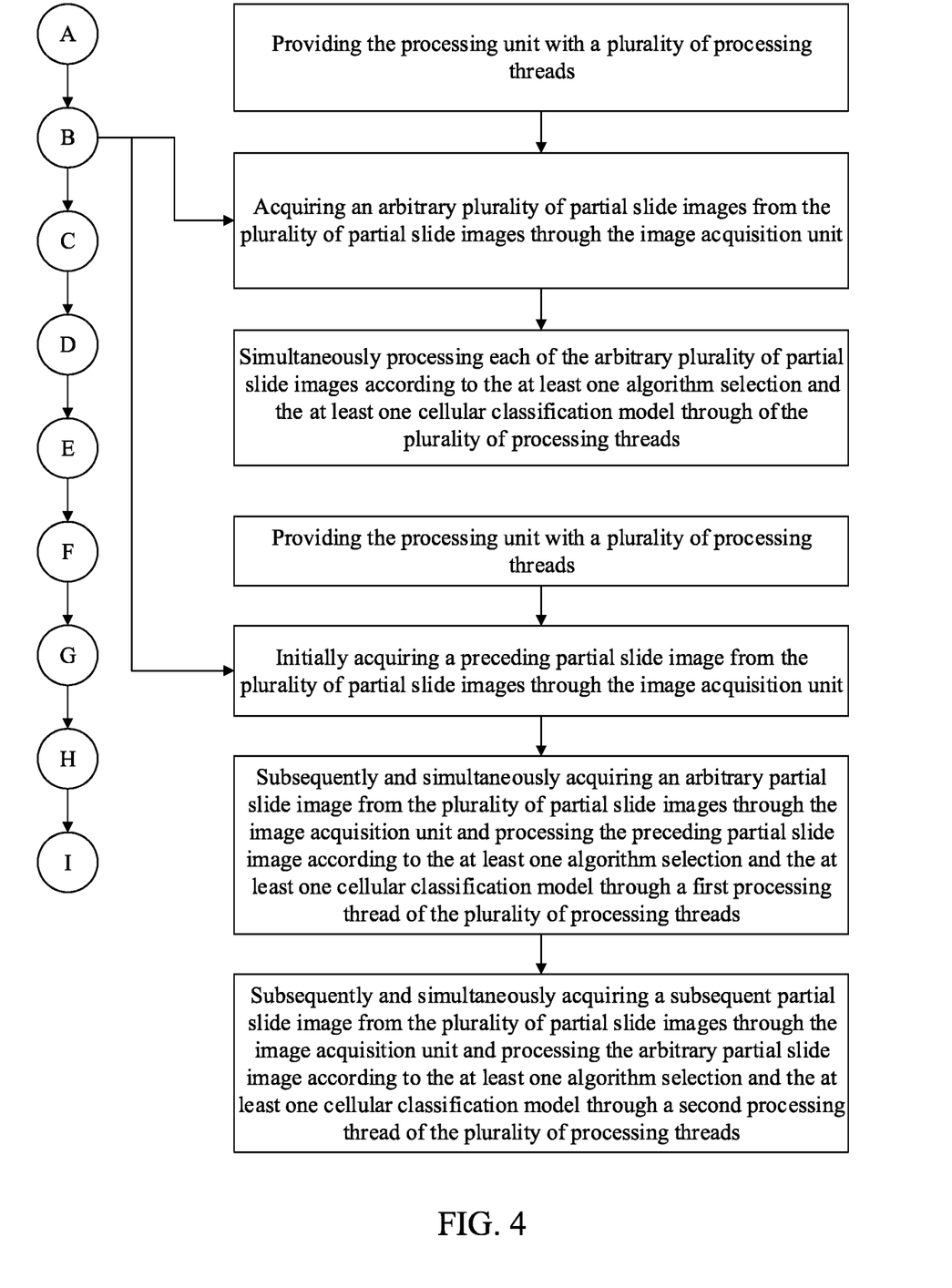
FIG. 4 is a stepwise flow diagram illustrating steps for parallelly processing the plurality of partial slide images analyzing in the method of the present invention.

As shown in FIG. 4, in the preferred embodiment, each region of the tissue sample is parallelly processed on different processing threads in order to reduce the overall processing time. To this end, the processing unit is provided with a plurality of processing threads. In some embodiments, an arbitrary plurality of partial slide images from the plurality of partial slide images is acquired through the image acquisition unit, and each of the plurality of arbitrary plurality of partial slide images is simultaneously processed according to the at least one algorithm selection and the at least one cellular classification model through the plurality of processing threads.

Alternatively or additionally, in some embodiments, a preceding partial slide from the plurality of partial slide images is initially acquired through the image acquisition unit. Subsequently and simultaneously, an arbitrary partial slide image from the plurality of partial slide images is acquired through the image acquisition unit, wherein the preceding partial slide image and the arbitrary partial slide image are acquired in immediate sequence. The preceding partial slide image is processed according to the at least one algorithm selection and the at least one cellular classification model through a first processing thread of the plurality of processing threads.

Subsequently and simultaneously, a subsequent partial slide image from the plurality of partial slide images is acquired through the image acquisition unit, and the preceding partial slide image is processed according to the at least one algorithm selection and the at least one cellular classification model through a second processing thread of the plurality of processing threads, wherein the arbitrary partial slide image and the subsequent partial slide image are acquired in immediate sequence.

Figure 5:
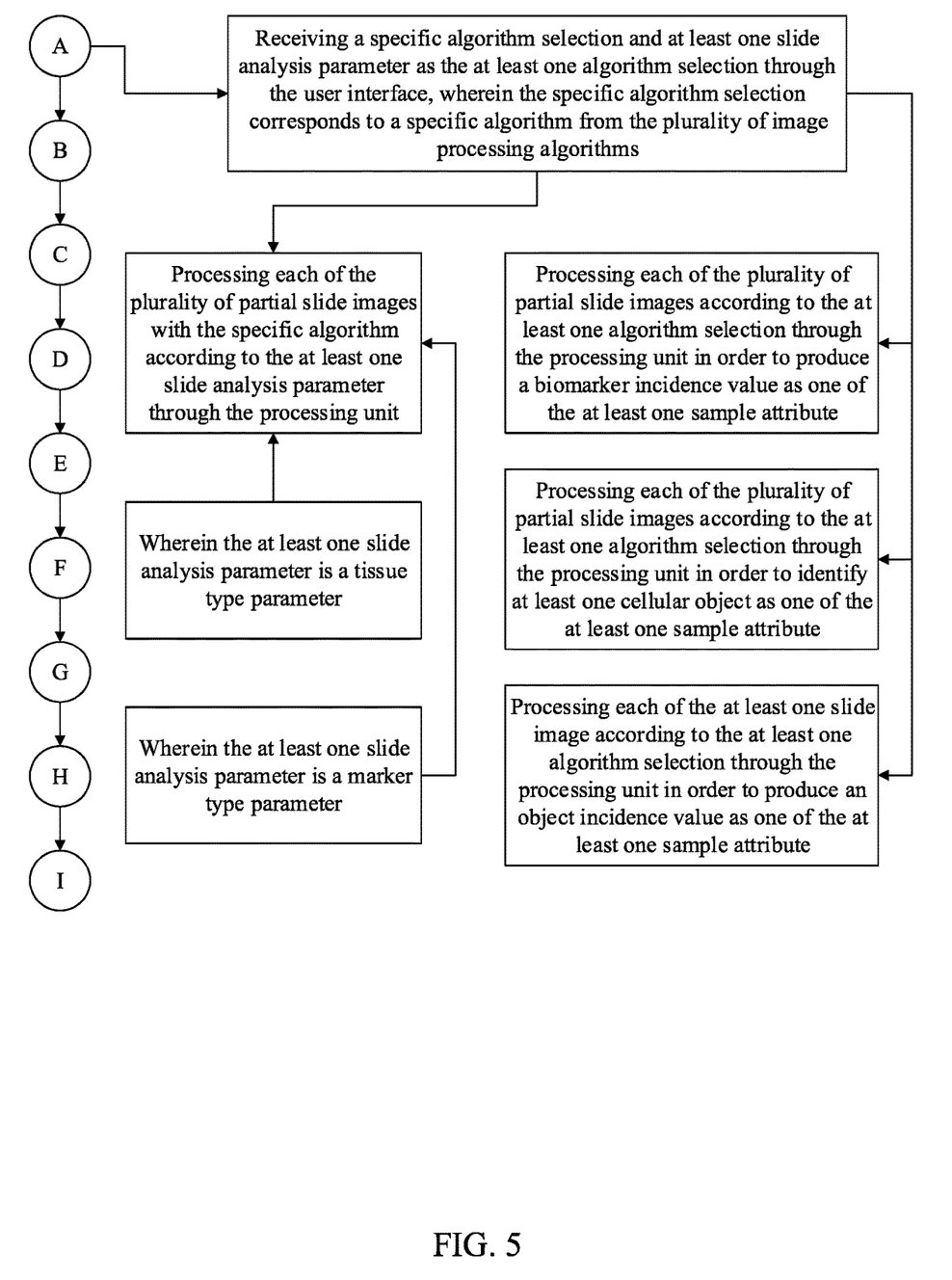
FIG. 5 is a stepwise flow diagram illustrating steps for processing the plurality of partial slide images according to slide analysis parameters in order to produce various sample attributes in the method of the present invention.

As shown in FIG. 5, the at least one sample attribute may vary in different embodiments depending on the nature of the tissue sample to be analyzed or the desired attribute to be measured. In some embodiments, each of the plurality of partial slide images is processed according to the at least one algorithm selection through the processing unit in order to produce a biomarker incidence value as one of the at least one sample attribute. In some embodiments, each of the plurality of partial slide images is processed according to the at least one algorithm selection through the processing unit in order to identify at least one cellular object as one of the at least one sample attribute. In some embodiments, each of the plurality of partial slide images is processed according to the at least one algorithm selection through the processing unit in order to produce a biomarker incidence value as one of the at least one sample attribute. In some embodiments, each of the plurality of partial slide images is processed according to the at least one algorithm selection through the processing unit in order to produce an object incidence value as one of the at least one sample attribute.

In various embodiments, the nature of the at least one algorithm selection may vary. In various embodiments, the at least one algorithm selection may correspond to, but is not limited to, selecting an algorithm to use for image processing, selecting one or more parameters to use for a particular algorithm, or other relevant image processing aspects. In some embodiments, a specific algorithm selection and at least one slide analysis parameter are received as the at least one algorithm selection through the user interface, wherein the specific algorithm selection corresponds to a specific algorithm from the plurality of image processing algorithms. Each of the plurality of partial slide images is processed with the specific algorithm according to the at least one slide analysis parameter through the processing unit. In some embodiments, the at least one slide analysis parameter may comprise a tissue type parameter. In some embodiments, the at least one slide analysis parameter may comprise a marker types parameter.

Figure 6:
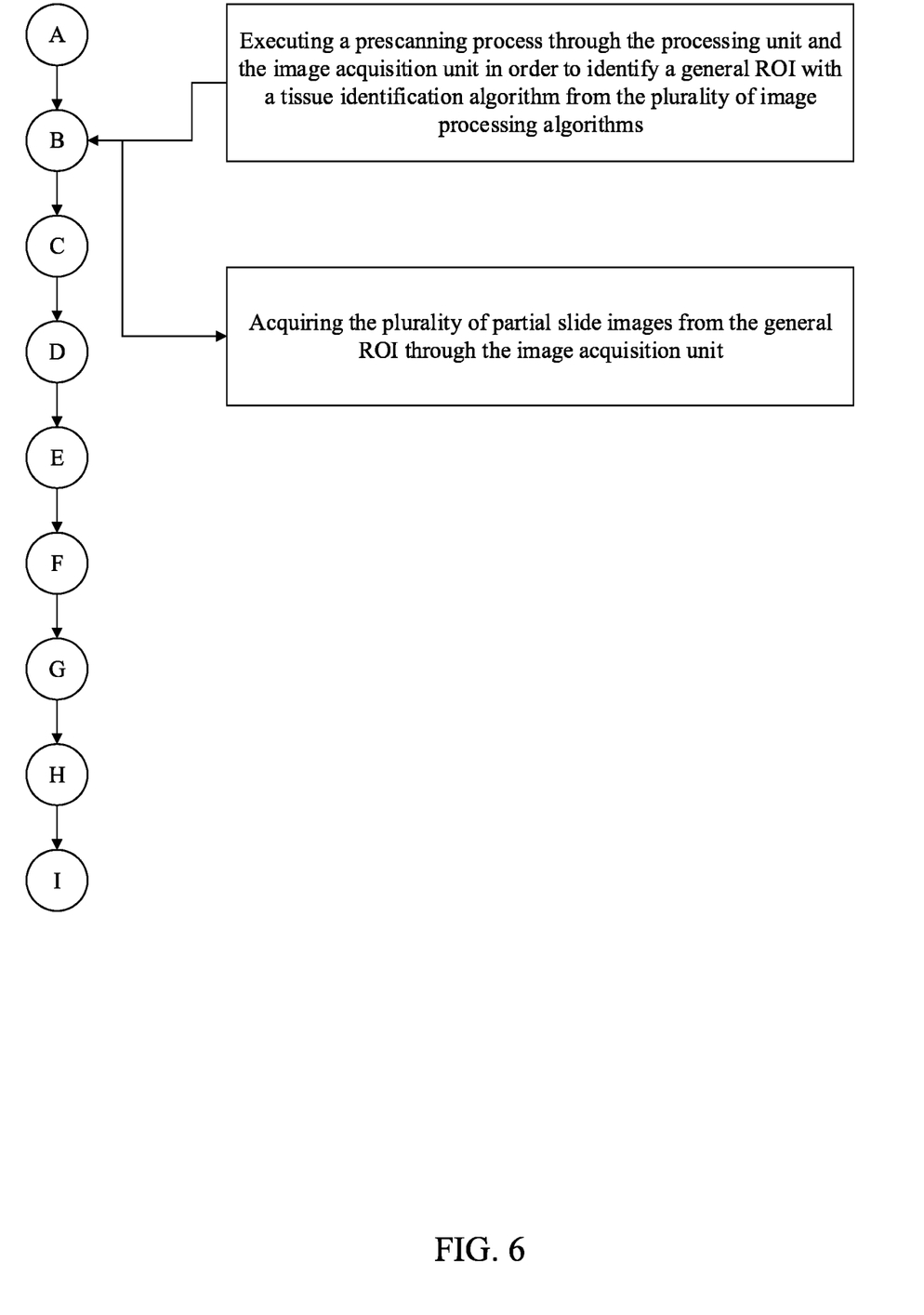
FIG. 6 is a stepwise flow diagram illustrating steps for executing a prescanning process in the method of the present invention.

In the preferred embodiment, the sample slide is pre-scanned in order to identify the position of the tissue sample so as to not waste time scanning empty regions of the sample slide. To this end, as shown in FIG. 6, a prescanning process is executed through the processing unit and the image acquisition unit in order to identify a general ROI with a tissue identification algorithm from the plurality of image processing algorithms, wherein the general ROI corresponds to the tissue sample mounted to the sample slide. The plurality of partial slide images is then acquired from the general ROI through the image acquisition unit.

Figure 7:
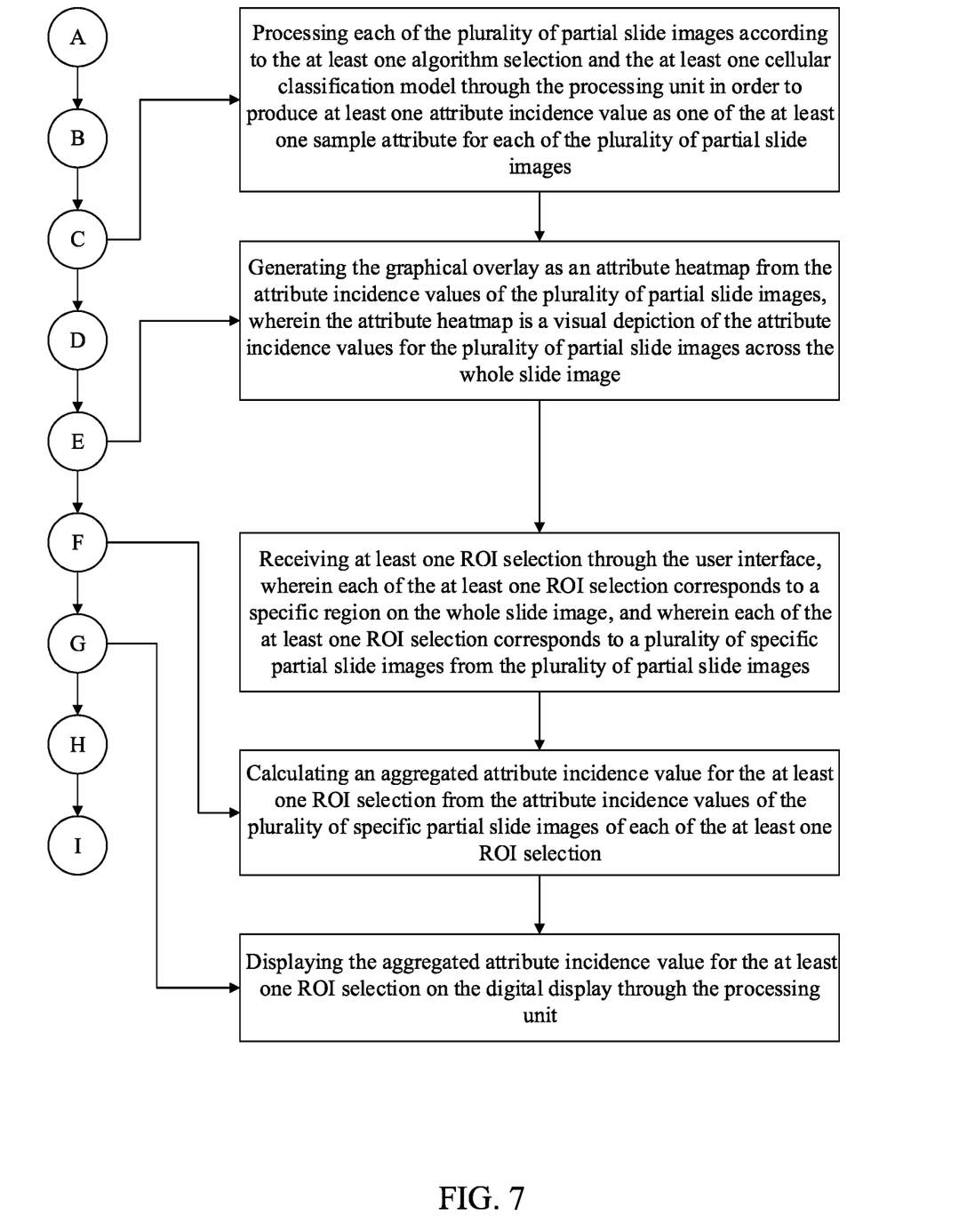
FIG. 7 is a stepwise flow diagram illustrating steps for displaying results of the image processing in the method of the present invention.

The aforementioned graphical overlay is one of the main desired features of the present invention which aids the user in seeking out areas of interest on the whole slide image. To this end, as shown in FIG. 7, each of the plurality of partial slide images is processed according to the at least one algorithm selection and the at least one cellular classification model through the processing unit in order to produce at least one attribute incidence value as one of the at least one sample attribute for each of the plurality of partial slide images. The graphical overlay is then generated as an attribute heatmap from the attribute incidence values of the plurality of partial slide images, wherein the attribute heatmap is a visual depiction of the attribute incidence values for the plurality of partial slide images across the whole slide image.

In the preferred embodiment, after the whole slide image is processed and the graphical overlay is displayed over the whole slide image on the digital display, the user may select one or more regions on the whole slide image to include on the analysis report. This is made easy by the graphical overlay, which gives the user a clear indication of regions of high incidence of an attribute, such as tumor cells, biomarkers, or other attributes. To this end, at least one ROI selection is received through the user interface, wherein each of the at least one ROI selection corresponds to a specific region on the whole slide image, and wherein each of the at least one ROI selection corresponds to a plurality of specific partial slide images from the plurality of partial slide images. An aggregated attribute incidence value is calculated for the at least one ROI selection from the attribute incidence values of the plurality of specific partial slide images of each of the at least one ROI selection, and the aggregated attribute incidence value is displayed for the at least one ROI selection on the digital display through the processing unit.

Figure 8:
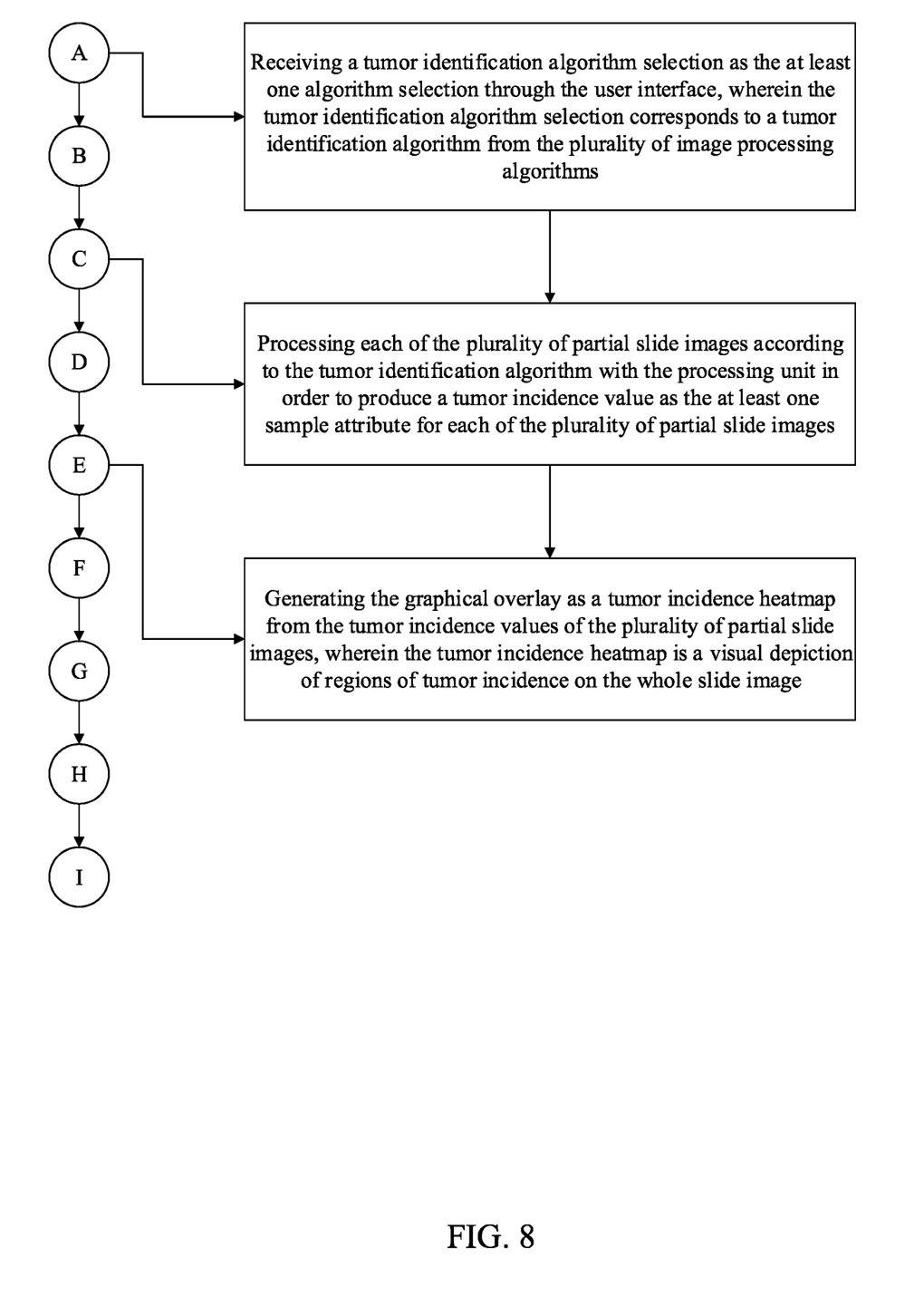
FIG. 8 is a stepwise flow diagram illustrating steps for displaying tumor identification results in the method of the present invention.

In the preferred embodiment, the graphical overlay may be generated as a heatmap for any desired attribute the user wishes to evaluate the tissue sample for. For example, the present invention may be utilized to analyze a tissue sample for the presence of tumor cells. To this end, as shown in FIG. 8, a tumor identification algorithm may be received as the at least one algorithm selection through the user interface, wherein the tumor identification algorithm selection corresponds to a tumor identification algorithm from the plurality of image processing algorithms. Each of the plurality of partial slide images is processed according to the tumor identification algorithm with the processing unit in order to produce a tumor incidence value as the at least one sample attribute for each of the plurality of partial slide images, and the graphical overlay is generated as a tumor incidence heatmap from the tumor incidence values of the plurality of partial slide images, wherein the tumor incidence heatmap is a visual depiction of regions of tumor incidence on the whole slide image.

Figure 10:
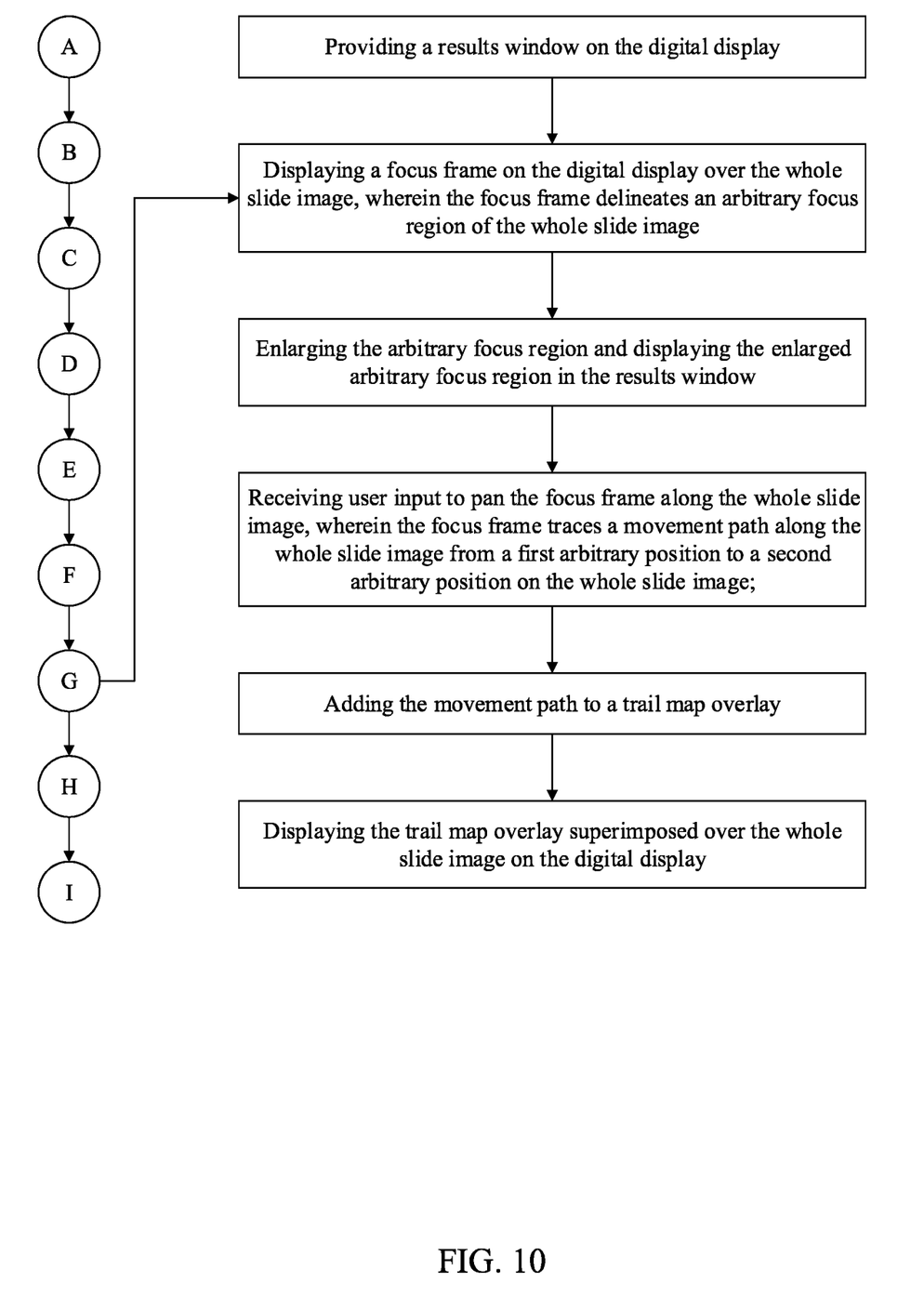
FIG. 10 is a stepwise flow diagram illustrating steps for utilizing the focus frame and implementing the trail map in the method of the present invention.

It is contemplated that in various embodiments, the results of the slide analysis process may be displayed for the user's viewing in any desirable manner. However, in the preferred embodiment, a results window is provided on the digital display. Furthermore, in the preferred embodiment, as shown in FIGS. 1 and 10, a focus frame is displayed on the digital display over the whole slide image, wherein the focus frame delineates an arbitrary focus region of the whole slide image. The user has control over the positioning of the focus frame, and may freely move the focus frame about the whole slide image. For any given position of the focus frame, the arbitrary focus region is enlarged and the enlarged arbitrary focus region is displayed in the results window. Thus, using the focus frame, the user is able to more closely inspect any region of the whole slide image. User input is received to pan the focus frame along the whole slide image, and as the focus frame moves from a first arbitrary position to a second arbitrary position on the whole slide image, the focus frame traces a movement path. For every movement of the focus frame, the movement path is added to a trail map overlay, and the trail map overlay may be displayed superimposed over the whole slide image on the digital display. The trail map provides the user with a visual indicator of every location on the whole slide image they have previously inspected using the focus frame; thus, if the user desires to return to a specific region on the whole slide image, it is easier for the user to find the specific region using the trail map than if they had to search the entire whole slide image for the specific region.

Figure 9:
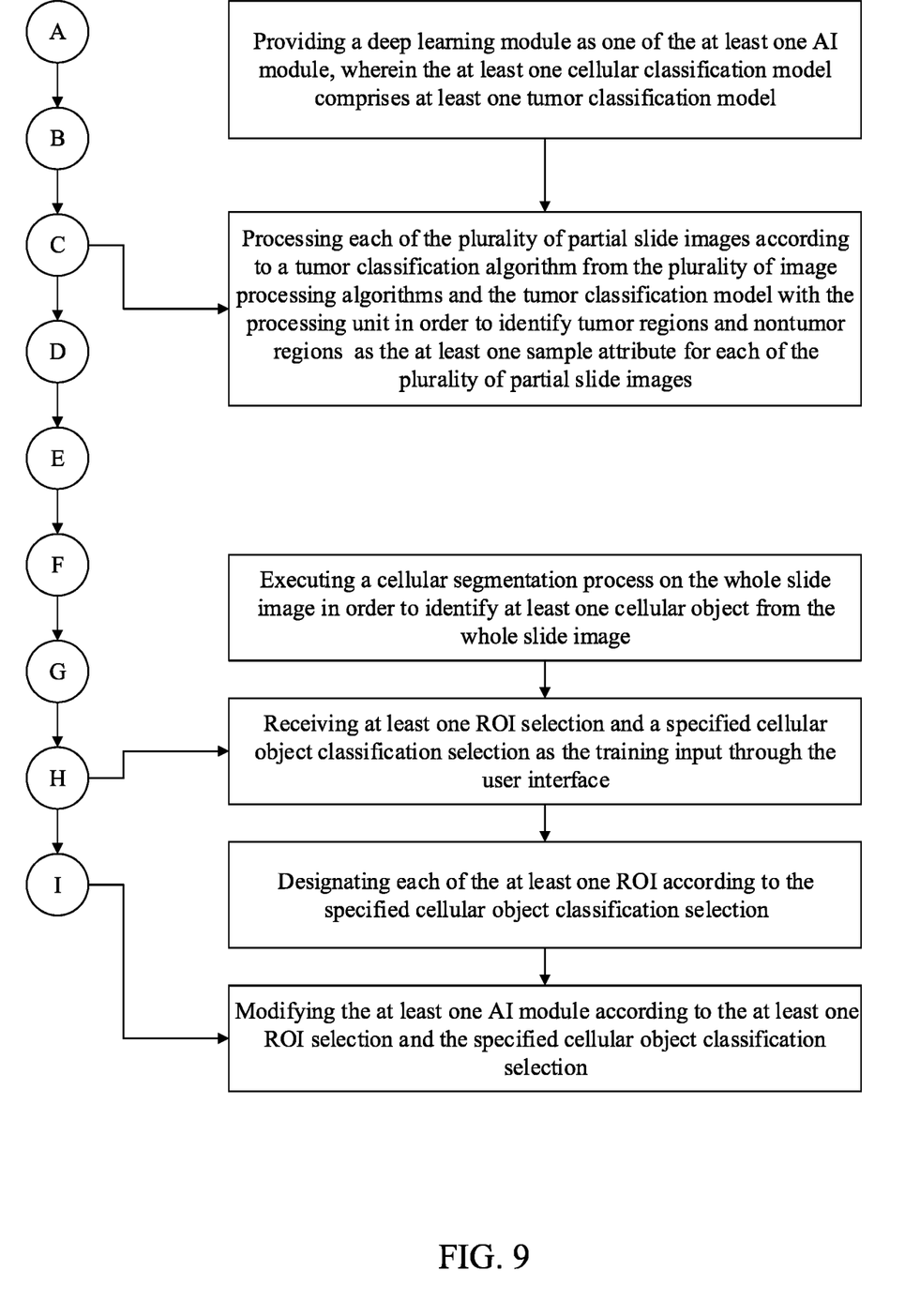
FIG. 9 is a stepwise flow diagram illustrating steps for utilizing and training the at least one AI module in the method of the present invention.

As shown in FIG. 9, in the preferred embodiment of the present invention, a deep learning module is provided as one of the at least one AI module, wherein the at least one cellular classification model comprises at least one tumor classification model. In the case that the tissue sample is to be analyzed for the presence of tumors, therefore, each of the plurality of partial slide images is processed according to a tumor classification algorithm from the plurality of image processing algorithms and the tumor classification model with the processing unit in order to identify tumor regions and nontumor regions as the at least one sample attribute for each of the plurality of partial slide images.

As previously mentioned, the AI based modules in the framework can be trained for classification. The specific means in which the AI modules may be trained may vary in different embodiment, but in general, the user is able to select regions on the whole slide image to label for classification. To this end, a cellular segmentation process may be executed on the whole slide image in order to identify at least one cellular object from the whole slide image. Alternatively, the cellular segmentation process may be executed on each of the plurality of partial slide images. At least one ROI selection and a specified cellular object classification selection is received through the user interface as the training input, and each of the at least one ROI is designated according to the specified cellular object classification selection. The at least one AI module is then modified according to the at least one ROI selection and the specified cellular object classification selection. Through this process, the user may manually train the AI modules. It should be noted that training of the AI modules is not limited to cellular objects, and may be performed with any relevant tissue feature type and image processing algorithm.

Although the invention has been explained in relation to its preferred embodiment, it is to be understood that many other possible modifications and variations can be made without departing from the spirit and scope of the invention as hereinafter claimed.

What is claimed is:

1. A method of operation of an artificial intelligence-equipped specimen scanning and analysis unit to digitally scan and analyze pathological specimen slides comprising the steps of:
providing a slide scanning system, a processing unit, a digital display, and a user interface, wherein the slide scanning system comprises an image acquisition unit, wherein the slide scanning system, the digital display, and the user interface are each electronically connected to the processing unit, wherein the processing unit manages a plurality of image processing algorithms and at least one artificial intelligence (AI) module, and wherein the at least one AI module comprises at least one cellular classification model;
providing a sample slide engaged with the slide scanning system, wherein a tissue sample is mounted to the sample slide;
(A) receiving at least one algorithm selection through the user interface, wherein the at least one algorithm selection corresponds to one of the plurality of image processing algorithms;
(B) acquiring a plurality of partial slide images of the sample slide through the image acquisition unit;
(C) processing each of the plurality of partial slide images according to the at least one algorithm selection and the at least one cellular classification model through the processing unit in order to produce at least one sample attribute for each of the plurality of partial slide images;
(D) assembling the plurality of partial slide images into a whole slide image through the processing unit;
(E) generating a graphical overlay from the sample attributes of each of the plurality of partial slide images through the processing unit;
(F) calculating at least one overall slide attribute incidence value for the whole slide image from the sample attributes of the plurality of partial slide images;
(G) displaying the whole slide image, the graphical overlay superimposed over the whole slide image, and the at least one overall slide attribute incidence value and on the digital display through the processing unit;
(H) receiving a training input through the user interface; and
(I) modifying the at least one AI module according to the training input through the processing unit.

2. The method of operation of an artificial intelligence-equipped specimen scanning and analysis unit to digitally scan and analyze pathological specimen slides as claimed in claim 1 comprising the steps of:
providing the processing unit with a plurality of processing threads;
acquiring an arbitrary plurality of partial slide images from the plurality of partial slide images through the image acquisition unit; and
simultaneously processing each of the arbitrary plurality of partial slide images according to the at least one algorithm selection and the at least one cellular classification model through of the plurality of processing threads.

3. The method of operation of an artificial intelligence-equipped specimen scanning and analysis unit to digitally scan and analyze pathological specimen slides as claimed in claim 1 comprising the steps of:
providing the processing unit with a plurality of processing threads;
initially acquiring a preceding partial slide image from the plurality of partial slide images through the image acquisition unit;
subsequently and simultaneously acquiring an arbitrary partial slide image from the plurality of partial slide images through the image acquisition unit and processing the preceding partial slide image according to the at least one algorithm selection and the at least one cellular classification model through a first processing thread of the plurality of processing threads, wherein the preceding partial slide image and the arbitrary partial slide image are acquired in immediate sequence; and
subsequently and simultaneously acquiring a subsequent partial slide image from the plurality of partial slide images through the image acquisition unit and processing the preceding partial slide image according to the at least one algorithm selection and the at least one cellular classification model through a second processing thread of the plurality of processing threads, wherein the arbitrary partial slide image and the subsequent partial slide image are acquired in immediate sequence.

4. The method of operation of an artificial intelligence-equipped specimen scanning and analysis unit to digitally scan and analyze pathological specimen slides as claimed in claim 1 comprising the steps of:
receiving a specific algorithm selection and at least one slide analysis parameter as the at least one algorithm selection through the user interface, wherein the specific algorithm selection corresponds to a specific algorithm from the plurality of image processing algorithms; and
processing each of the plurality of partial slide images with the specific algorithm according to the at least one slide analysis parameter through the processing unit.

5. The method of operation of an artificial intelligence-equipped specimen scanning and analysis unit to digitally scan and analyze pathological specimen slides as claimed in claim 4, wherein the at least one slide analysis parameter is a tissue type parameter.

6. The method of operation of an artificial intelligence-equipped specimen scanning and analysis unit to digitally scan and analyze pathological specimen slides as claimed in claim 4, wherein the at least one slide analysis parameter is a marker type parameter.

7. The method of operation of an artificial intelligence-equipped specimen scanning and analysis unit to digitally scan and analyze pathological specimen slides as claimed in claim 1 comprising the steps of:
executing a prescanning process through the processing unit and the image acquisition unit in order to identify a general region of interest (ROI) with a tissue identification algorithm from the plurality of image processing algorithms, wherein the general ROI corresponds to the tissue sample mounted to the sample slide; and acquiring the plurality of partial slide images from the general ROI through the image acquisition unit.

8. The method of operation of an artificial intelligence-equipped specimen scanning and analysis unit to digitally scan and analyze pathological specimen slides as claimed in claim 1 comprising the steps of:

processing each of the plurality of partial slide images according to the at least one algorithm selection and the at least one cellular classification model through the processing unit in order to produce at least one attribute incidence value as one of the at least one sample attribute for each of the plurality of partial slide images; and generating the graphical overlay as an attribute heatmap from the attribute incidence values of the plurality of partial slide images, wherein the attribute heatmap is a visual depiction of the attribute incidence values for the plurality of partial slide images across the whole slide image.

9. The method of operation of an artificial intelligence-equipped specimen scanning and analysis unit to digitally scan and analyze pathological specimen slides as claimed in claim 8 comprising the steps of:

receiving at least one ROI selection through the user interface, wherein each of the at least one ROI selection corresponds to a specific region on the whole slide image, and wherein each of the at least one ROI selection corresponds to a plurality of specific partial slide images from the plurality of partial slide images;

calculating an aggregated attribute incidence value for the at least one ROI selection from the attribute incidence values of the plurality of specific partial slide images of each of the at least one ROI selection; and displaying the aggregated attribute incidence value for the at least one ROI selection on the digital display through the processing unit.

10. The method of operation of an artificial intelligence-equipped specimen scanning and analysis unit to digitally scan and analyze pathological specimen slides as claimed in claim 1 comprising the steps of:

receiving a tumor identification algorithm selection as the at least one algorithm selection through the user interface, wherein the tumor identification algorithm selection corresponds to a tumor identification algorithm from the plurality of image processing algorithms;

processing each of the plurality of partial slide images according to the tumor identification algorithm with the processing unit in order to produce a tumor incidence value as the at least one sample attribute for each of the plurality of partial slide images; and generating the graphical overlay as a tumor incidence heatmap from the tumor incidence values of the plurality of partial slide images, wherein the tumor incidence heatmap is a visual depiction of regions of tumor incidence on the whole slide image.

11. The method of operation of an artificial intelligence-equipped specimen scanning and analysis unit to digitally scan and analyze pathological specimen slides as claimed in claim 1 comprising the steps of:

providing a deep learning module as one of the at least one AI module, wherein the at least one cellular classification model comprises at least one tumor classification model; and processing each of the plurality of partial slide images according to a tumor classification algorithm from the plurality of image processing algorithms and the tumor classification model with the processing unit in order to identify tumor regions and nontumor regions as the at least one sample attribute for each of the plurality of partial slide images.

12. The method of operation of an artificial intelligence-equipped specimen scanning and analysis unit to digitally scan and analyze pathological specimen slides as claimed in claim 1 comprising the steps of:

executing a cellular segmentation process on the whole slide image in order to identify at least one cellular object from the whole slide image;

receiving at least one ROI selection and a specified cellular object classification selection as the training input through the user interface;

designating each of the at least one ROI according to the specified cellular object classification selection; and modifying the at least one AI module according to the at least one ROI selection and the specified cellular object classification selection.

13. The method of operation of an artificial intelligence-equipped specimen scanning and analysis unit to digitally scan and analyze pathological specimen slides as claimed in claim 1 comprising the steps of:

providing a results window on the digital display;

displaying a focus frame on the digital display over the whole slide image, wherein the focus frame delineates an arbitrary focus region of the whole slide image;

enlarging the arbitrary focus region and displaying the enlarged arbitrary focus region in the results window;

receiving user input to pan the focus frame along the whole slide image, wherein the focus frame traces a movement path along the whole slide image from a first arbitrary position to a second arbitrary position on the whole slide image;

adding the movement path to a trail map overlay; and displaying the trail map overlay superimposed over the whole slide image on the digital display.

14. The method of operation of an artificial intelligence-equipped specimen scanning and analysis unit to digitally scan and analyze pathological specimen slides as claimed in claim 1 comprising the step of:

processing each of the plurality of partial slide images according to the at least one algorithm selection through the processing unit in order to produce a biomarker incidence value as one of the at least one sample attribute.

15. The method of operation of an artificial intelligence-equipped specimen scanning and analysis unit to digitally scan and analyze pathological specimen slides as claimed in claim 1 comprising the step of:

processing each of the plurality of partial slide images according to the at least one algorithm selection through the processing unit in order to identify at least one cellular object as one of the at least one sample attribute.

16. The method of operation of an artificial intelligence-equipped specimen scanning and analysis unit to digitally scan and analyze pathological specimen slides as claimed in claim 1 comprising the step of:

processing each of the at least one slide image according to the at least one algorithm selection through the processing unit in order to produce an object incidence value as one of the at least one sample attribute.

* * * * *